United States Patent [19]
Bauer et al.

[11] Patent Number: 5,567,284
[45] Date of Patent: Oct. 22, 1996

[54] ELECTROCHEMICAL ACTUATOR

[75] Inventors: Helmut Bauer; Foad Derisavi-Fard; Uwe Eckoldt; Ralf Gehrmann, all of Duisburg; Heribert Kickel, Straelen, all of Germany

[73] Assignee: Friwo Silberkraft Gesellschaft fuer Batterietechnik mbH, Duisburg, Germany

[21] Appl. No.: 416,676

[22] PCT Filed: Jul. 7, 1994

[86] PCT No.: PCT/EP94/02289
§ 371 Date: Apr. 7, 1995
§ 102(e) Date: Apr. 7, 1995

[87] PCT Pub. No.: WO95/08709
PCT Pub. Date: Mar. 30, 1995

[30] Foreign Application Priority Data

Sep. 18, 1993 [DE] Germany ............... 43 31 763.4

[51] Int. Cl.⁶ ............... C25B 9/00; H01M 8/18
[52] U.S. Cl. ............... 204/256; 429/27; 429/210
[58] Field of Search ............... 429/27, 101, 210; 204/194, 400, 242, 256, 258, 277, 278

[56] References Cited

U.S. PATENT DOCUMENTS

| | | | |
|---|---|---|---|
| 3,563,878 | 2/1971 | Grotheer | 204/256 |
| 3,875,040 | 4/1975 | Weltin et al. | 204/256 X |
| 4,159,367 | 6/1979 | Berchielli et al. | 429/101 X |
| 4,565,749 | 1/1986 | Ommering et al. | 429/27 |
| 5,425,864 | 6/1995 | Botte | 204/256 X |

FOREIGN PATENT DOCUMENTS 4116739  7/1992  Germany.

*Primary Examiner*—Anthony Skapars
*Attorney, Agent, or Firm*—Townsend and Townsend and Crew

[57] ABSTRACT

An electrochemical actuator forms a sealed gas space inside of which there are a plurality of cells. Each cell has a solid electrode made from an electrochemically reversibly oxidizable material and a counter electrode. By applying a reversible direct current, an electrochemical reaction is initiated which results in a pressure increase or decrease in the gas space that can be used for generating movement. The manufacture of the actuator is simplified and manufacturing costs are lowered by providing a stackable spacer frame for each cell which is constructed of a material that is a relatively good heat conductor and an electric isolator. The rim of a metallic cell cup is attached to the spacer frame and a matrix soaked with an electrolyte is placed inside the cup. Each cell further has a solid electrode, a separator and a counter electrode which, together with the spacer frame, are assembled into a cell. When the cells are stacked, the counter electrode of each cell is placed against the cell cup of the adjoining cell.

18 Claims, 2 Drawing Sheets

ELECTROCHEMICAL ACTUATOR

BACKGROUND OF THE INVENTION

This invention relates to an electrochemical actuator with a sealed gas space and multiple cells each of which includes a solid electrode made from an electrochemically reversibly oxidizable material and a counter electrode. A reversible electrochemical reaction initiated by a direct current generates in the gas space an increase or a decrease in the prevailing pressure.

German patent document DE 41 16 739 C1 discloses an electrochemical actuator with a housing in which electrochemical cells are stacked. When a direct current is applied, gas is generated or absorbed, depending on the direction of the current, so that a bellows operatively coupled with the cells expands or contracts. Each cell in the stack has a solid electrode, a separator and a counter electrode. The counter electrode is made of carbon layers and has a water repelling carbon layer to prevent that the electrolyte contacts a back layer made of graphite paper. The stack of cells is assembled from individual electrodes and separators and is disposed inside an isolating envelope. The layered construction of the counter electrode as well as the manner in which the stacks must be built up is complicated and relatively expensive. Additionally, the disclosed actuator has the disadvantage that generated heat is insufficiently conducted away from the cells, which adversely affects both the service life and functioning of the actuator.

SUMMARY OF THE INVENTION

The problem underlying the present invention is to provide an electrochemical actuator constructed as set forth above but which is simpler and less costly to produce, which has a longer service life, and which functions better.

This is achieved by providing for each cell a stackable spacer frame constructed of a material which is an electric isolator and has good heat conducting characteristics. A metallic cell cup filled with a matrix soaked in the electrolyte is attached to the frame. Each cell further includes a solid body electrode, a separator and a counter electrode. When stacked, the counter electrodes of the cells engage the cell cup of the adjoining cells.

The provision of spacers which can be stacked has the advantage that the assembly and stacking of the cells is quick and efficient. A cell cup incorporated in the spacer receives a matrix for the electrolyte. The other components of the cell; namely, a solid electrode, a separator and a counter electrode, are placed on top thereof. The assembled cells are placed one on top of the other for stacking them so that the counter electrode protrudes slightly from the spacer, extends into the spacer of an adjacent cell, and engages the cell cup of the latter. This construction prevents a lateral displacement of the cells in the stack.

The spacer with the cell cup is made of an electrically isolating material and substantially prevents stray currents between the cells. In addition, the spacers are constructed of a material which is a good heat conductor so that generated heat is carried away from the cells. Several materials or composites have such properties. The spacer can be injection molded from a plastic material including a powdered additive which is a good heat conductor and an electric isolator. Suitable additives are, for example, aluminum oxide, titanium oxide or quartz. However, the spacers can also be made of ceramic oxide materials.

The spacer preferably has cutouts for coupling the gas generating or absorbing counter electrode of the cell with the sealed gas space of the actuator. The cutouts form channels to the gas space along the circumference of the stack of cells. This assures an efficient pressure increase or decrease in the bellows surrounding the gas space.

The removal of heat from the cells is enhanced by positioning the spacers of the cells closely against the housing in which they are received.

The matrix is advantageously soaked with the electrolyte to provide the relatively large amount of electrolyte that is needed for the long-term use of the actuator. A variety of electrode pairs can be used for the reversible, gas generating or gas absorbing electrochemical reaction. Presently preferred are solid body electrodes made of silver or nickel hydroxide which cooperate with a gas generating or gas absorbing counter electrode made of a carbon material. A preferred, particularly easily manufactured counter electrode which is especially well suited for stacking and placement against adjacent cells is made of a carbon mass which includes a binder and which is applied to a stretch metal plate that forms a contact surface to the next cell.

DESCRIPTION OF THE PREFERRED EMBODIMENTS

Figure 1:
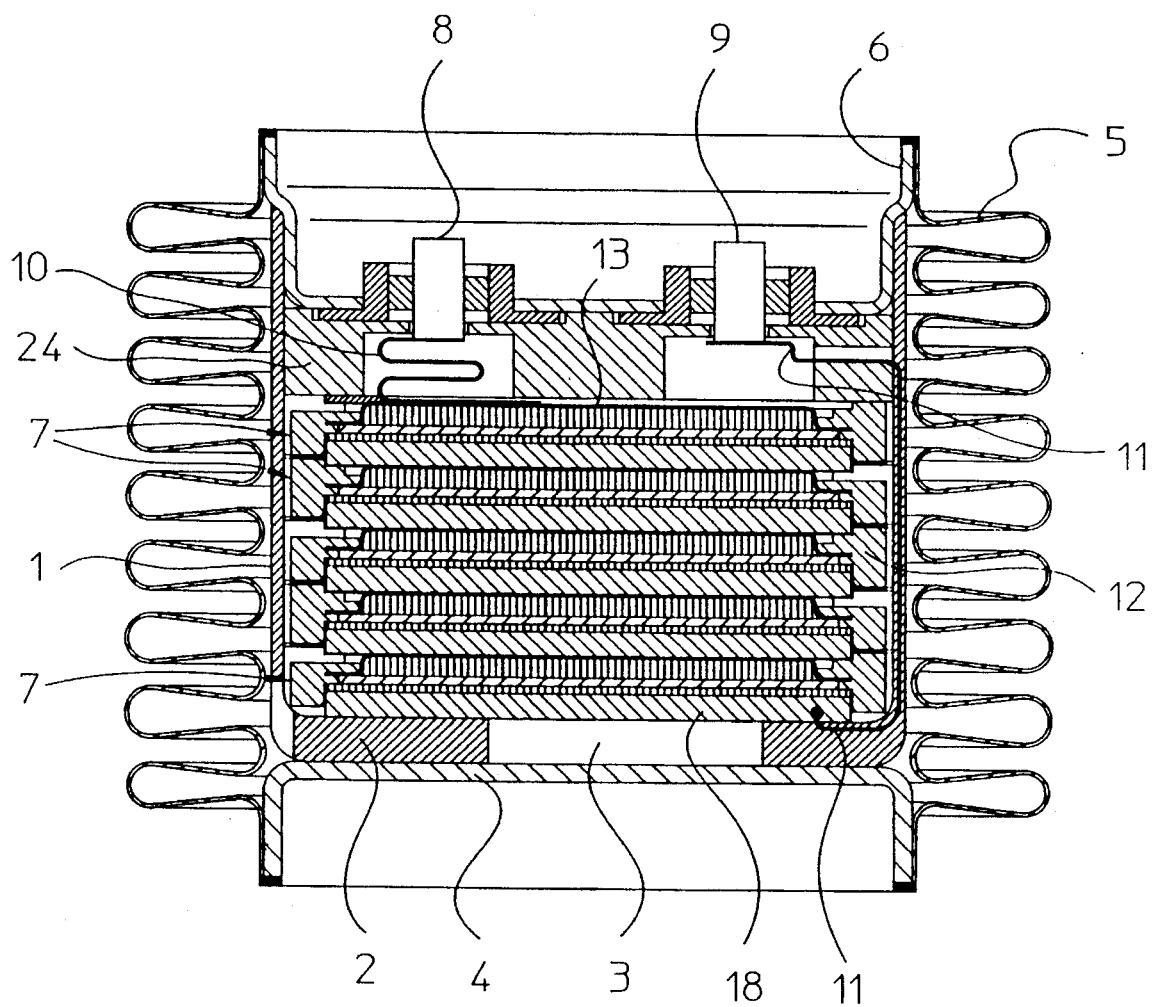
FIG. 1 is an elevational view, in section, through an electrochemical actuator.

Referring to FIG. 1, an electrochemical actuator constructed in accordance with the present invention includes a housing 1 having a base 2 with an opening 3, an actuator plate 4 and a metallic bellows 5. The bellows is secured to a periphery of the actuator plate and to a metal cover 6.

Housing 1 is closed by a cover 6, and a cell stack of electrochemical cells 7 is disposed inside the housing. A first connector pin 8 is mounted on cover 6 and electrically coupled to a cell cup of the uppermost cell 7 via a lead 10. A further contact pin 9 is electrically coupled to counter electrode 18 via an electric lead 11 embedded in the plastic material of which housing 1 is constructed.

Figure 2:
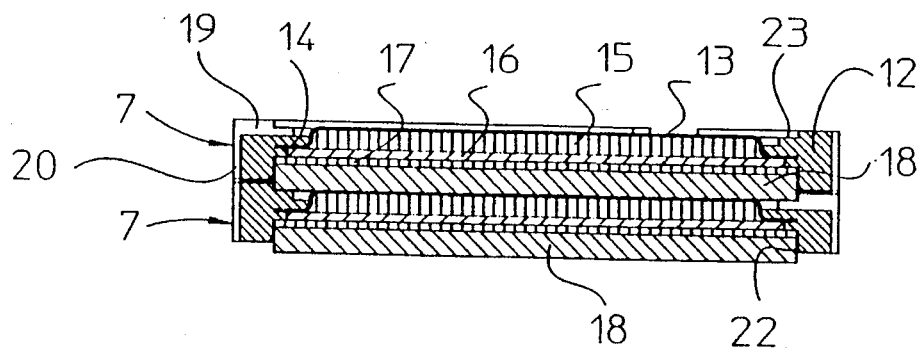
FIG. 2 illustrates, in section, two cells of the actuator shown in FIG. 1.
Figure 3:
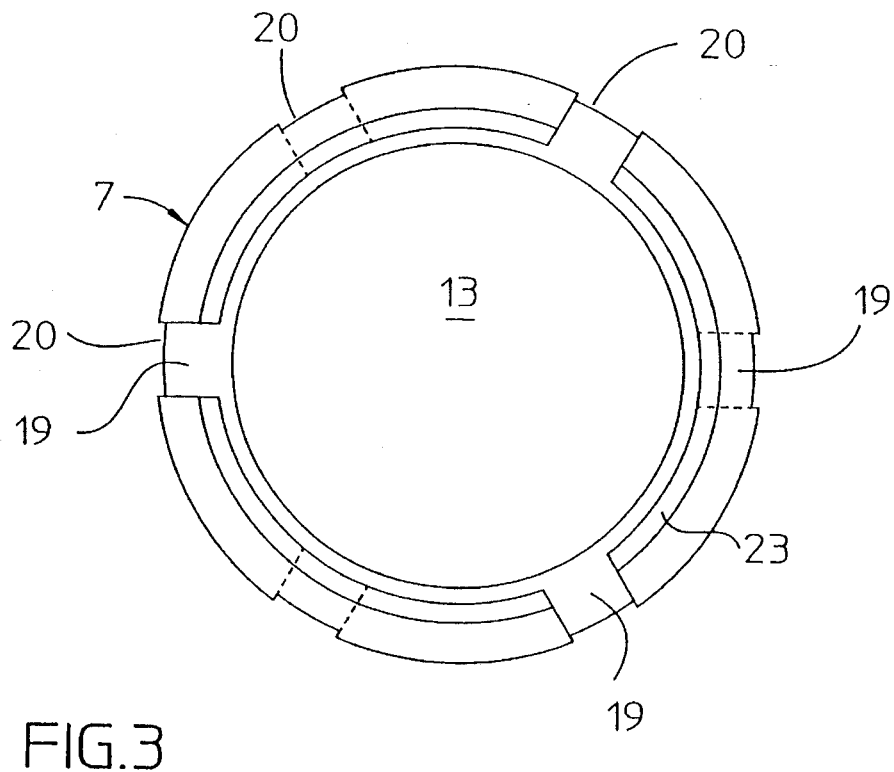
FIG. 3 is a plan view of the cells in FIG. 2.

Referring to FIGS. 2 and 3, each cell 7 has a spacer ring 12, a cell cup 13, a matrix 15 saturation soaked with an electrolyte, a solid body electrode 16, a separator 17, and a counter electrode 18. The spacer 12 is constructed of a material which is a good heat conductor and an electric isolator such as a ceramic oxide or a plastic material to which a heat conducting, electrically nonconducting powdered additive has been added; for example, aluminum oxide, titanium oxide, quartz or the like. The spacer can be injection molded. Cell cup 13 is constructed of a metal and has a flat rim 14 formed; e.g. molded, into spacer 12 so that it is rigidly connected thereto. Matrix 15 can be constructed of a material such as a porous ceramic oxide or the like that is capable of absorbing the electrolyte.

Figure 4:
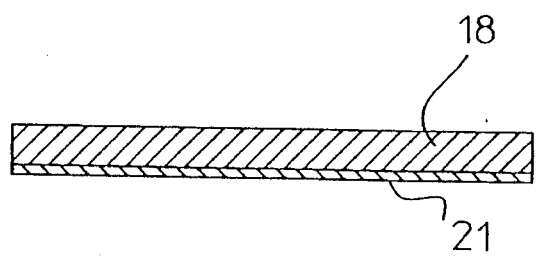
FIG. 4 is an enlarged cross-section of a counter electrode for the cells.

Solid body electrode 16 is constructed of an oxidizable material; for example, silver, nickel hydroxide or the like, and is preferably sintered. An electrode made of carbon is particularly well suited as the gas generating and absorbing counter electrode 18. It comprises a carbon mass with a binder, such as PTFE, which is present in an amount from about 20 to about 40% by weight and is applied to a stretch metal plate 21 made of nickel, high-grade steel or the like, as is shown in FIG. 4.

Cells 7 are assembled as follows. Matrix 15 is first placed into cell cup 13 secured to spacer ring 12. Solid electrode 16, separator 17 and counter electrode 18 are then placed on top thereof. Spacer 12 includes an annular under-cut 22 which is dimensioned to receive the components of the cell. The under-cut has a depth selected so that counter electrode 18 protrudes slightly past the end of the spacer. The protruding counter electrode end is received in an annular under-cut 23 of the adjoining spacer 12 of the next cell 7. In this manner the cells become interleaved when they are stacked one on top of the other to prevent relative lateral movements between them. Alternatively, lateral displacement can be prevented by providing cooperating recesses and projections in the respective opposing end faces of the spacers, in which event the counter electrode need not protrude past the end of the spacer. When stacked, the electrical contact surface formed by stretch metal 21 of counter electrode 18 contacts cell cup 13 of the adjoining cell in the stack so that the cells in the stack are connected in series.

Spacer 12 has radial and axial cutouts 19, 20 in the rim of the spacer adjacent the gas forming counter electrode 18. These cutouts form gas flow channels between the counter electrodes, to opening 3 in base 2 and/or into the gas space formed by bellows 5 and actuator plate 4.

When a D.C. potential is applied to contact pins 8, 9, with the pin 8 being positive, the metal of solid electrode 16 oxidizes while hydrogen is generated by counter electrode 18. This causes a pressure increase in the closed gas space and thereby forces actuator plate 4 away from housing 1. When a reverse potential is applied, the metal oxide of solid electrode 16 is again reduced while hydrogen is oxidized at the counter electrode, which in turn results in a pressure reduction and therewith a return movement of the actuator plate. This back-and-forth motion of the actuator plate can be used for regulating or controlling processes or devices such as, for example, for operating control valves on heaters such as radiators.

When necessary, the rate with which the generated heat is removed from cells 7 can be increased by incorporating in housing 1 and/or cover 6 heat conducting bodies, or by constructing housing 1 and cover 6 of heat conducting and electrically isolating materials. FIG. 1 shows an exemplary heat conducting body 24 affixed to or incorporated into the under-side of cover 6.

What is claimed is:

1. An electrochemical actuator with a sealed gas space and a plurality of cells each including a solid body electrode made of an electrochemically reversibly oxidizable material and a counter electrode, wherein a reversible electrochemical reaction initiated by a D.C. current causes a pressure increase or a pressure decrease in the gas space which can be transformed into motion, characterized in that each cell is defined by a stackable, frame-shaped spacer constructed of a material which is an electric isolator and has good heat conducting characteristics, the spacer receiving a rim of a metal cell cup (13) holding a matrix (15) soaked with an electrolyte, a solid body electrode (16), a separator (17) and a counter electrode (18), and wherein in a stack the counter electrode (18) of each cell (7) engages the cell cup (13) of the adjacent cell (7).

2. Electrochemical actuator according to claim 1 characterized in that the counter electrode (18) protrudes past the spacer (12) and into the spacer (12) of the adjacent cell (7).

3. Electrochemical actuator according to claims 1, characterized in that the spacer (12) is constructed of a plastic mass having a pulverized additive which is an electric isolator and has good heat conducting characteristics.

4. Electrochemical actuator according to claim 3 characterized in that the additive is selected from aluminum oxide, titanium oxide or quartz.

5. Electrochemical actuator according to claim 1, characterized in that the spacer (12) includes cutouts (19, 20) which form a flow communication between the counter electrode of the cell (7) with the gas space.

6. Electrochemical actuator according to claim 1 characterized in that the spacers (12) of the cells (7) arranged in a housing (1) of the actuator are closely adjacent the housing.

7. Electrochemical actuator according to claim 1 characterized in that the matrix (15) is constructed of a synthetic material through which the electrolyte can flow.

8. Electrochemical actuator according to claim 1 characterized in that the solid body electrode (16) is constructed of silver or nickel hydroxide.

9. Electrochemical actuator according to claim 1 characterized in that the counter electrode (18) is constructed of a carbon mass which includes a binder and is applied to a stretch metal (21) forming a contact surface for the adjacent cell (7).

10. An electrochemical actuator comprising means forming a sealed gas space and a plurality of cells each including a stackable spacer frame constructed of a material which is a relatively good heat conductor and an electric isolator, a metal cell cup connected with the frame, a matrix soaked with an electrolyte disposed in the cell cup, a solid electrode, a separator, and a counter electrode connected with the frame, the spacer frames being stacked one on top of the other so that the counter electrodes of the cell touch cell cups of respective adjoining cells, the solid electrodes being constructed of an electrochemically reversibly oxidizable material so that the application of D.C. potential results in an electrochemical reaction which increases or decreases a pressure in the gas space for generating motion therewith.

11. An electrochemical actuator according to claim 10 wherein each spacer frame defines a recess and wherein the counter electrode protrudes past an end of the spacer frame and extends into a recess of the frame of the adjoining cell.

12. An electrochemical actuator according to claim 10 wherein the spacer frame is constructed of a plastic material which includes a powdered additive which is a relatively good heat conductor and an electric isolator.

13. An electrochemical actuator according to claim 12 wherein the additive is a material selected from the group consisting of aluminum oxide, titanium oxide and quartz.

14. An electrochemical actuator according to claim 10 wherein the spacer frame includes cutouts which establish flow communication between the counter electrode of each cell and the gas space.

15. An electrochemical actuator according to claim 10 including a housing, and wherein the spacer frames of the cells in the housing are in close proximity to the housing.

16. An electrochemical actuator according to claim 10 wherein the matrix comprises a synthetic material through which the electrolyte can flow.

17. An electrochemical actuator according to claim 10 wherein the solid body electrode is constructed of a material selected from the group consisting of silver and nickel hydroxide.

18. An electrochemical actuator according to claim 10 including a stretch metal plate, wherein the counter electrode is constructed of a material comprising carbon and a binder, and wherein the counter electrode is connected to the stretch metal plate so that the stretch metal plate forms a contact surface for the adjoining cell.

\* \* \* \* \*